United States Patent [19]

Blomquist

[11] Patent Number: 4,586,383

[45] Date of Patent: May 6, 1986

[54] ELECTRONIC PRESSURE GAUGE AND FLOW METER

[76] Inventor: George W. Blomquist, 905 S. Holly St., Hammond, La. 70401

[21] Appl. No.: 417,454

[22] Filed: Sep. 13, 1982

[51] Int. Cl.$^4$ ............................ G01L 7/08; G01L 9/00
[52] U.S. Cl. ......................................... 73/706; 73/717; 73/733; 73/756; 374/188; 374/201
[58] Field of Search .......... 73/706, 707, 708, 716–722, 73/723–731, 715, 756; 374/201, 202, 203, 188

[56] References Cited

U.S. PATENT DOCUMENTS

| | | | |
|---|---|---|---|
| 3,343,420 | 9/1967 | Kondo et al. ........................ | 73/708 |
| 3,501,959 | 3/1970 | Womack ............................... | 73/706 |
| 3,657,926 | 4/1972 | Munson et al. ................... | 73/717 X |
| 3,865,100 | 2/1975 | Kanai et al. ...................... | 73/707 X |
| 4,077,261 | 3/1978 | Ring et al. ......................... | 73/706 |
| 4,167,122 | 9/1979 | Siegel ................................. | 73/706 |
| 4,227,418 | 10/1980 | Bonner et al. ..................... | 73/706 |
| 4,445,385 | 5/1984 | Endo ................................... | 73/706 |

FOREIGN PATENT DOCUMENTS

0520242 1/1956 Canada ................................. 73/716

Primary Examiner—Donald O. Woodiel
Attorney, Agent, or Firm—Burns, Doane, Swecker & Mathis

[57] ABSTRACT

A pressure gauge includes a cylindrical member having a flexible plate covering one end. Center flex of the plate is used to measure the force applied by fluid pressure. A low pressure transducer electrically measures the applied force. Pressure is transmitted from the flexible plate to the transducer by hydraulic fluid enclosed in the cylinder by a plastic boot. The boot is sealed to the cylinder by a sweat fit between the cylinder and a coaxial collar. The range of forces that can be measured is controlled by the thickness and diameter of the plate. In addition to pressure, the gauge can be used to measure temperature and orifice opening, and provide an indication of volumetric flow of the fluid.

40 Claims, 25 Drawing Figures

ELECTRONIC PRESSURE GAUGE AND FLOW METER

BACKGROUND OF THE INVENTION

The present invention relates to pressure gauges, and more particularly to a gauge having a modular construction that enables it to be adapted to sense pressure and/or temperature over relatively wide ranges with the use of a relatively low pressure transducer that produces a highly accurate digital output signal.

In the past, the measurement of pressure or temperature over different ranges has required different types of sensing gauges with varying degrees of accuracy. For example, relatively low pressures can be measured with mechanical or electrical transducers that are low cost and have high accuracy. However, when high pressures are to be measured, such as those that are encountered at a well head during oil drilling operations, it is necessary to utilize more expensive high pressure transducers that are less accurate. Sometimes the initial pressure that is encountered at a well head is so high that even the capacity of presently available state of the art high pressure transducers is exceeded.

At the other extreme, the measurement of relatively small changes in pressure or the measurement of very low pressures also requires transducers that are quite expensive.

Consequently, in situations where it is necessary to measure different pressures, wherein each pressure might be in a range that is substantially different from that of the other pressures, it is necessary to have on hand a variety of different types of transducers, each of which might have a different degree of accuracy, and some of which may be quite expensive.

OBJECTS OF THE INVENTION

It is therefore a general object of the present invention to provide a novel pressure sensing unit that is capable of providing a high degree of accuracy over a relatively broad range of pressures.

It is another object of the present invention to provide such a measurement device that incorporates a relatively low cost, high accuracy transducer.

It is a further object of the present invention to provide a novel sensing unit that enables a single low pressure transducer to be coupled with a modular pressure modification unit that accommodates the transducer for use in measuring pressure values outside of its normal capacity.

It is yet a further object of the present invention to provide a novel pressure sensing gauge that can also be used as a temperature sensing or an orifice sensing unit.

It is still another object of the present invention to provide a novel signal processing circuit for temperature and pressure gauges that enables the gauges to be used as a flow meter.

It is still a further object of the present invention to provide a novel temperature and pressure sensing gauge that can be calibrated, or nulled, from a remote location.

The manner in which the present invention achieves the foregoing objects, and their attendant advantages, can best be understood with reference to the following detailed description of preferred embodiments of the invention illustrated in the accompanying drawings.

DETAILED DESCRIPTION OF THE PREFERRED EMBODIMENTS

In the following discussion of the preferred embodiments of the invention illustrated in the accompanying drawings, description thereof is made with particular reference to the use of the invention in the field of oil and gas well production, where such description facilitates an understanding of the invention and its operation. However, it will be appreciated by those having familiarity with the art that the potential applications of the invention are much more widespread. Examples of other applications in which the invention can be used include medical, industrial, manufacturing fields, and volumetric measurement of fuels at retail pumps.

Figure 1:
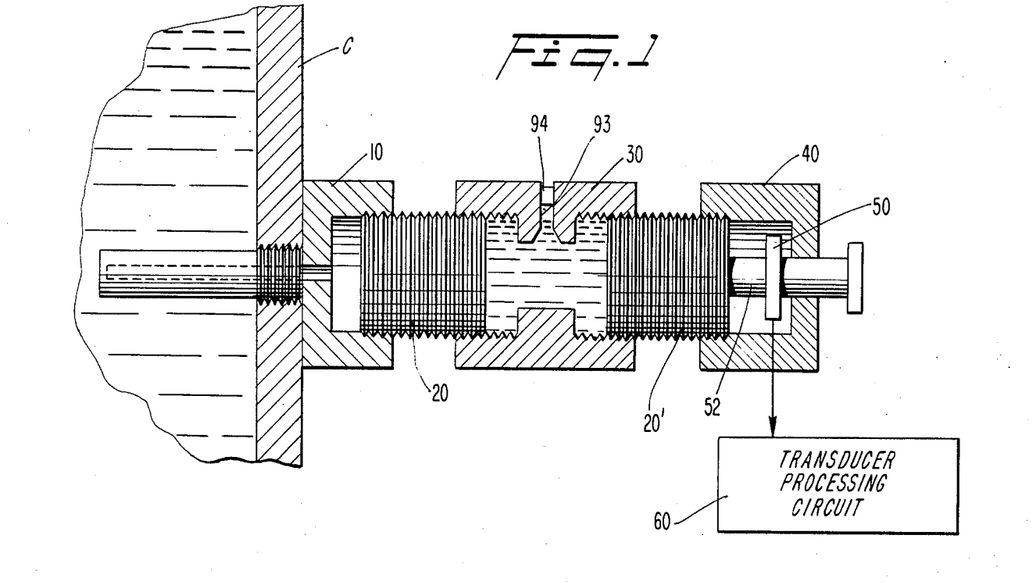
FIG. 1 is a side view, partly in section, that generally illustrates the major components of a sensing gauge constructed in accordance with the principles of the present invention.

Referring to FIG. 1, the general components that make up a pressure measuring system constructed in accordance with the present invention are schematically illustrated. In the example of FIG. 1, the invention is illustrated in the particular application of measuring the pressure or temperature of fluid in a container. The temperature or pressure sensitive gauge includes a function adapter 10 that is attached to the wall of the container C, for example by means of threading it thereto, and is in operative communication with the fluid within the container. The function adapter 10 provides a fluidic output signal that is related to the particular parameter (e.g. pressure or temperature) being measured. This fluidic output signal is conveyed to a pressure cylinder 20.

The pressure cylinder 20 senses the pressure of the output signal from the adapter 10 and modifies it, i.e. amplifies or reduces the pressure as required, to produce a modified pressure output signal. The pressure cylinder 20 is connected in series with a second pressure cylinder 20' by means of an hydraulic module main housing 30. The main housing 30 is filled with a substantially non-compressible fluid, such as an hydraulic fluid, and transmits the modified pressure signal from the first pressure cylinder 20 to the second pressure cylinder 20'. In the second pressure cylinder, the pressure signal can be further modified so that the output signal that it produces is within the operating range of a low pressure transducer. As many pressure cylinders 20 can be connected in series by means of main module housings 30 as is necessary to achieve the required modification of the signal to bring an initially sensed pressure within the operating range of a transducer to be used.

A transducer interface unit 40 is connected to the last pressure cylinder in the series, in this case the second pressure cylinder 20'. The transducer interface unit houses a low cost, highly accurate low pressure transducer 50. The modified pressure output signal from the pressure cylinder 20' is communicated to the transducer 50 by means of a secondary interface member 52. The transducer 50 produces an electrical output signal in response to the sensed pressure, which signal is transmitted to a remotely located transducer processing circuit 60 that preferably produces a digital output signal related to the initially sensed parameter.

The designs of the pressure cylinders and the main housings are preferably standardized, so that various ones can be easily interchanged as conditions require. Standardization also results in the reduction of the cost of manufacturing at optimum quantities.

While the main housing 30, the adapter 10 and the interface unit 40 are shown in FIG. 1 as being separated for easier illustration, in actual practice they may be in contact with one another, thereby completely enclosing the pressure cylinders 20.

Figure 2:
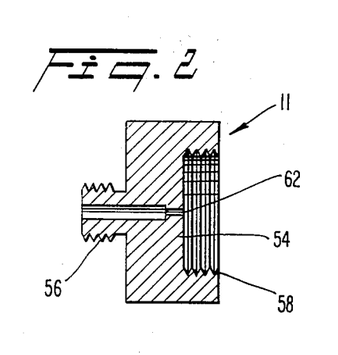
FIG. 2 is a sectional side view of a function adapter for the measurement of pressure.

An embodiment of a function adapter 11 for use in sensing pressures is illustrated in cross-sectional form in FIG. 2. The adapter comprises a housing 54 that is of cylindrical shape and has a relatively narrow portion and a larger annular portion. External threads 56 are provided on the end of the narrow portion of the adapter 11 to enable it to be threaded into a hole in the wall of a container C that houses the fluid whose pressure is to be measured. The larger annular portion of the adapter includes internal threads 58 that enable it to be attached to a pressure cylinder 20. The adapter 11 has an axial orifice 62 that provides fluid communication between the interior of the tank and a pressure cylinder 20 that is attached to it by its internal threads 58.

Figure 3:
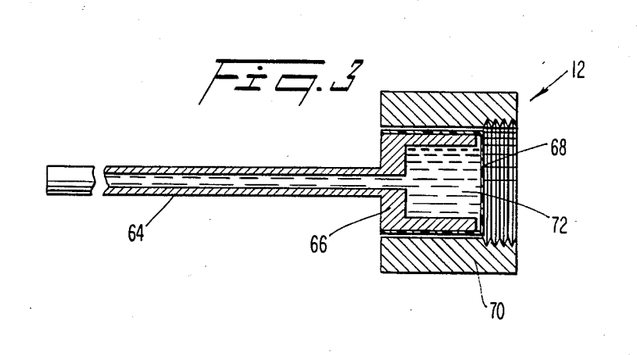
FIG. 3 is a sectional side view of a function adapter for the measurement of temperature.

A second embodiment of a function adapter 12 for use in the measurement of temperature is illustrated in FIG. 3. The adapter includes a probe having a long narrow portion 64 that is closed at one end that is inserted into the fluid whose temperature is to measured. The other end of the probe includes an enlarged cylindrical portion 66 that is open. This open end of the probe is covered by a flexible diaphragm 68. The diaphragm 68 extends around the sides of the enlarged portion 66 of the probe, and is disposed between the enlarged portion and a sleeve housing 70 that is tightly fitted to the probe. The interior cavity 72 of the probe is filled with a suitable medium that expands and contracts in response to fluctuations in temperature. For example, the medium can be alcohol when the temperatures to be measured are in a low to medium temperature range, mercury for the measurement of medium to high temperatures, and inert gas for extremely high temperature applications. Changes in the volume of the medium in response to temperature fluctuations cause the diaphragm 68 to move, thereby providing a pressure signal that is transmitted to a pressure cylinder 20 threadingly coupled to the housing 70.

Figure 4:
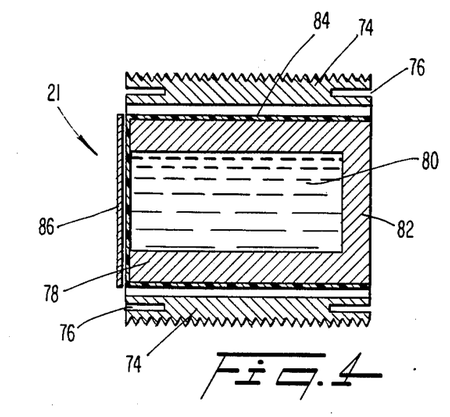
FIG. 4 is a sectional side view of a first embodiment of a pressure cylinder with the spacing between elements being exaggerated for purposes of illustration.

A first embodiment of a pressure cylinder, for providing a modified pressure output signal in response to a received pressure input signal, is illustrated in FIG. 4. The cylinder includes a collar 74 having external threads for attachment to a function adapter 10 and an hydraulic module main housing 30. The collar can be provided with suitable slots 76 on one or both of the end faces thereof, to accept a tool, such as a socket driver, to facilitate insertion of the cylinder into the hydraulic module and the function adapter. A cylinder 78 having an axial recess providing an internal cavity 80 is fitted within the collar 74 and tightly fitted thereto. The end face of the cylinder 78 that is opposite the side on which the recess is formed provides a wall 82 having a degree of flexibility that is determined by its thickness and its surface area, i.e. the diameter of the cavity. The cavity 80 is filled with a suitable substantially non-compressible fluid, such as an hydraulic fluid, and its open end is covered with a flexible diaphragm boot 84. The boot extends around the sides of the cylinder 78 and is disposed between the cylinder and the collar 74. The boot 84 is preferably made of a polyethylene material, and includes a protective wafer or disk 86 that is fixed to the exterior surface of the boot on the end face of the cylinder 78. The disk 86 can be made of aluminum, for example.

The pressure cylinder can be assembled by filling the cavity 80 with the hydraulic fluid, and fitting the boot 84 over its open end when all air pockets have been removed from the cavity. For example, this can be accomplished by submerging the cylinder in hydraulic fluid and fitting the boot over it while it is submerged. The cylinder is then cooled until contraction of the material permits the collar 74 to slip over the circumferential wall of the cylinder and the external diaphragm boot. The cooling of the cylinder can be carried out while it is immersed in the hydraulic fluid to prevent any air from entering the cavity 80. In addition, the collar 74 can be heated to cause it to expand, but care must be taken that the heat from the collar does not damage the boot 84. Once the elements are positioned as illustrated in FIG. 4, they are allowed to return to normal temperature, causing the collar 74 to seat on the cylinder 78 and seal the diaphragm boot 84 between them.

Figure 5:
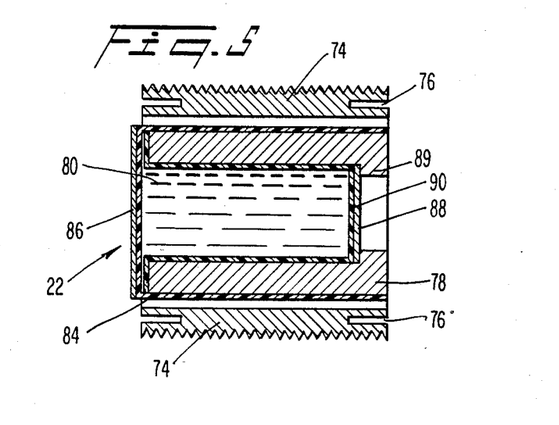
FIG. 5 is a sectional side view of a second embodiment of a pressure cylinder.

A second embodiment of a pressure cylinder 22 is illustrated in FIG. 5. In this embodiment, the flexible wall is not formed by an end face of the cylinder 78. Rather, both ends of the cylinder are open, and the flexible wall is provided by a separate piece of material such as a spring steel disk 88. The position of the disk 88 can be affixed by an annular shoulder 89 provided on one end of the cylinder 78. The diameter of the opening provided by the shoulder 89 is determined in accordance with the desired pressure modification characteristics. An internal flexible cup 90 lines the cavity 80 to prevent leakage of any hydraulic fluid at the flexible wall 88. In all other respects the pressure cylinder 22 illustrated in FIG. 5 is the same as that of FIG. 4.

Figure 6:
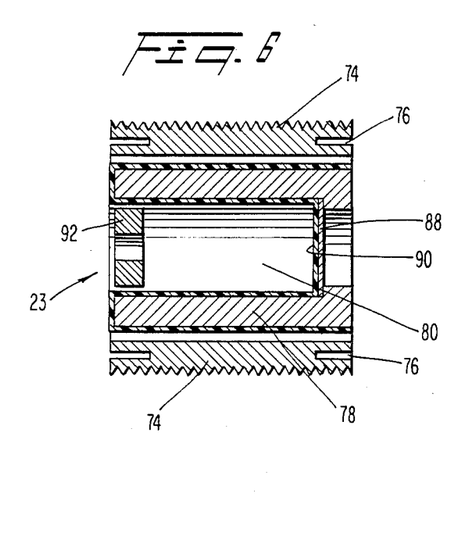
FIG. 6 is a sectional side view of a third embodiment of a pressure cylinder.

A third embodiment of a pressure cylinder 23 is illustrated in FIG. 6. This pressure cylinder is similar to the embodiment 22 of FIG. 5, except that it does not include an external diaphragm boot. Rather, the open end of the cavity 80 is provided with an internal orifice plate or ring 92 that is tightly fitted to the cylinder 78 to hold the internal diaphragm cup 90 between it and the cylinder. The size of the orifice provided by the plate 92 is determined in accordance with the desired operating characteristics of the pressure sensing gauge. In contrast to the previously described embodiments, the pressure cylinder 23 illustrated in FIG. 6 is not filled with an hydraulic fluid prior to its attachment to the main module housing 30. Rather, it is attached to the housing with the orifice provided by the plate 92 opening to the interior of the main module housing 30. The pressure cylinder 23 is filled with an hydraulic fluid when the housing itself is filled. For this purpose, the main module housing is provided with a bleed and fill tube or opening 93 that can be closed by means of a socketed screw 94, for example.

The embodiments of pressure cylinders 21 and 22 illustrated in FIGS. 4 and 5 can be inserted into a main module housing 30 with either end of the cylinder in contact with the hydraulic fluid in the housing, since these are self-contained modules. Accordingly, insert slots 76 for accepting a socket wrench can be provided on both end faces of the threading collar 74. Preferably, when insert slots are provided on both end faces, they are offset on one face relative to those on the other face to maintain structural integrity. However, in the embodiment of the pressure cylinder illustrated in FIG. 6, it is possible to insert the cylinder into the main module housing 23 in only one direction. Therefore, in this embodiment, the insert slots 76 are provided on only one end face of the threading collar 74, i.e. the end face that is on the same end as the flexible wall 88.

Figure 7:
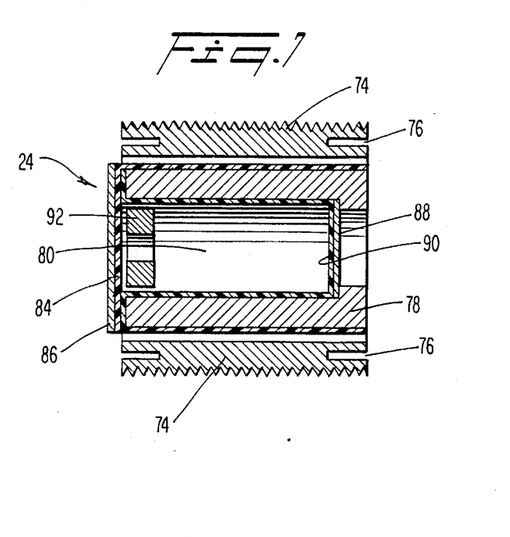
FIG. 7 is a sectional side view of a fourth embodiment of a pressure cylinder.

A fourth embodiment 24 of a pressure cylinder is illustrated in FIG. 7. This embodiment basically comprises a combination of the features of the pressure cylinders 22 and 23 illustrated in FIGS. 5 and 6, respectively. In other words, it includes both an internal orifice disk 92 and an external flexible diaphragm boot 84 having a protective wafer 86. In this embodiment, the cavity 80 is filled with an hydraulic fluid prior to the attachment of the boot 84, and therefore comprises a self-contained module that can be reversibly inserted into the main module housing 30. Accordingly, insert slots 76 are provided on both faces of the threading collar 74.

Figure 8:
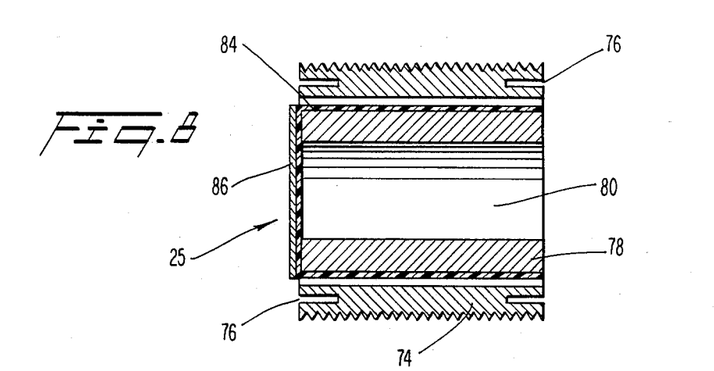
FIG. 8 is a sectional side view of a fifth embodiment of a pressure cylinder.

Another embodiment of a pressure cylinder 25 is illustrated in FIG. 8. In this embodiment, the pressure cylinder is provided with an external diaphragm flexible boot 84 having a protective wafer 86, but it does not include a flexible wall on the opposite face thereof. Similar to the pressure cylinder 23 of FIG. 6, the interior cavity 80 of the cylinder 25 remains open to the interior of the main module housing 30. Accordingly, only one end face of the collar 74 is provided with insert slots 76 in this embodiment.

Figure 9:
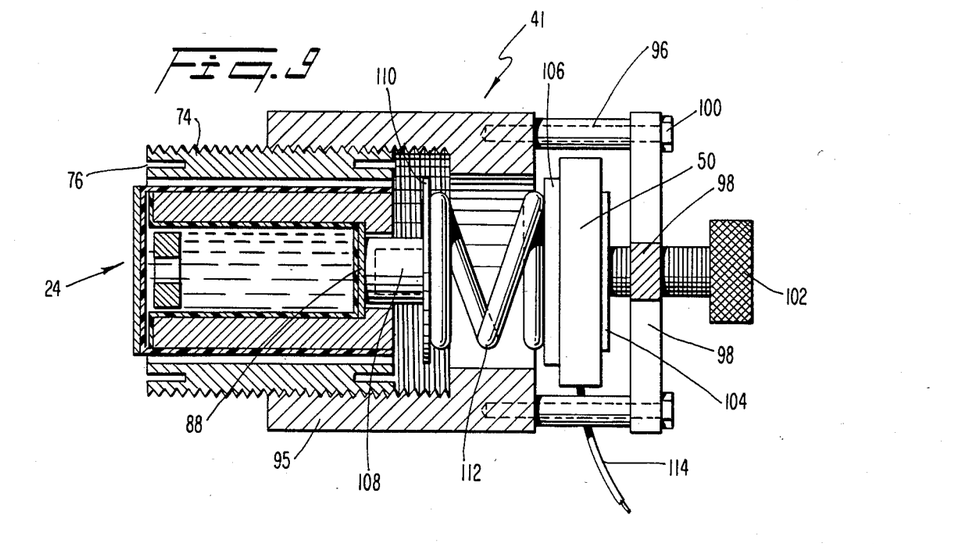
FIG. 9 is a sectional side view of a first emodiment of a transducer interface unit in combination with the pressure cylinder illustrated in FIG. 7.

A first embodiment of a transducer interface unit 41, for receiving the pressurized output signals from a pressure cylinder and providing them to a transducer, is illustrated in FIG. 9. In the illustration of FIG. 9, the unit 41 is shown in operative relationship with a pressure cylinder 24 of the type illustrated in FIG. 7. The unit includes a cylindrical housing 95 having internal threads for cooperation with the external threads on the threading collar 74 of the pressure cylinder 24. A nulling support member 98 is attached to the housing 95 by means of bolts 100 and spacing sleeves 96. A threaded knob 102 is attached to the support member 98 and abuts against one face of a nulling plate 104. The other face of the plate 104 is in contact with one side of a low pressure transducer 50. The other side of the transducer 50 is substantially covered by a top plate 106.

The flexible wall 88 of the pressure cylinder 24 is engaged by a solid body primary interface member 108. A base plate 110 is attached to the primary interface member 108, and a secondary interface member 112 is disposed between the base plate 110 and the top plate 106. In the illustration of FIG. 9, the secondary interface member comprises a spring, and thereby forms a flexible interface member. Alternatively, a solid body 113 (FIG. 10) can be interposed between the two plates 106 and 110 to thereby provide a non-flexible or solid secondary interface member. For example, a non-flexible secondary interface member may be desirable in applications where a narrow range of pressure fluctuations is to be measured, and greater sensitivity to such fluctuations is desired.

The transducer interface unit 41 operates to communicate the modified pressure output signal, that is provided by changes in the position of the flexible wall 88 of the pressure cylinder 24, to the transducer 50. The changes that are sensed by the transducer are transmitted as electrical signals along a suitable output line 114. The threaded knob 102 can be used to adjust the initial pressure on the transducer 50 within the interface unit 41, to thereby set the output signal of the transducer at a desired null value.

Figure 10:
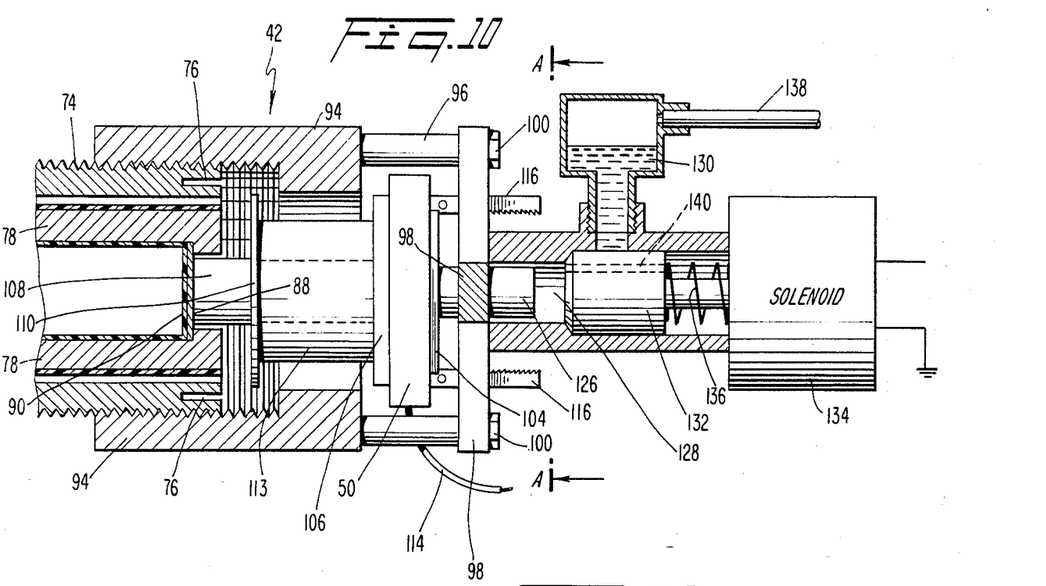
FIG. 10 is a sectional side view of a second embodiment of a transducer interface unit that has remote nulling capabilities.
Figure 11:
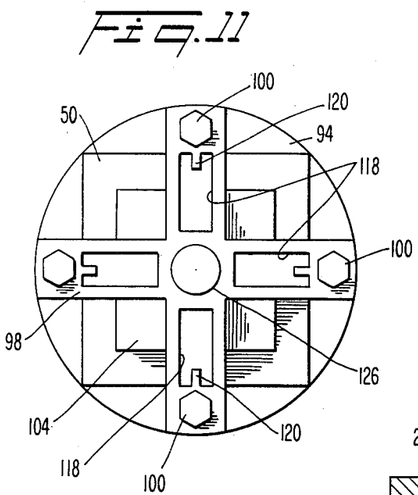
FIG. 11 is an end view of the transducer interface unit of FIG. 10 taken along the sectional line A—A of FIG. 10.
Figure 11A:
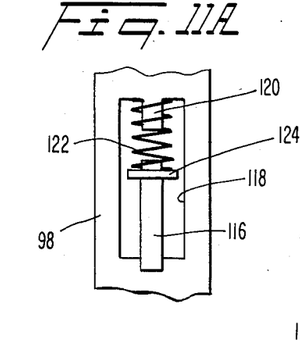
FIGS. 11A and 11B are detailed illustrations of the support member and ratchet mechanism of the transducer interface unit illustrated in FIGS. 10 and 11.
Figure 11B:
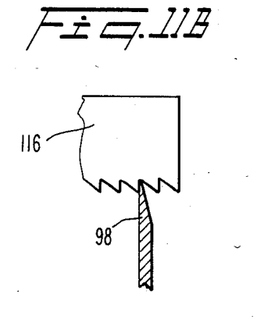

A second embodiment of a transducer interface unit 42 is illustrated in FIG. 10. This embodiment differs from that of FIG. 9 in that it provides for nulling of the transducer 50 from a location remote from the unit itself, rather than requiring local nulling through a nulling knob or the like. To accommodate the remote nulling function, the nulling plate 104 is provided with ratcheted position locks 116, that cooperate with the nulling support member 98. This feature is illustrated in greater detail in FIGS. 11, 11A and 11B. Referring to FIG. 11, the nulling support member 98 has a cross-like configuration, and each arm thereof is provided with a cutout 118. The position locks 116 protrude through the cutouts 118 and engage the nulling support member 98 along an edge of the cutout, as illustrated in FIGS. 11A and 11B. Preferably, the edge of the cutout that is engaged by the position lock 116 is bevelled, as illustrated in FIG. 11B. On the opposite end of each cutout a projection, or stem, 120 is provided to support a spring 122. A pressure pad 124, preferably made of a suitable low-friction material, is attached to the end of the spring 122 opposite the stem 120 and biases the position lock 116 into the engagement with the edge of the cutout 118. The position lock 116 thereby inhibits movement of the nulling plate 104 to the right, as viewed in FIG. 10.

In place of the nulling knob 102, a nulling piston 126 is provided in a bore in the center of the nulling support member 98. The piston 126 is disposed in a cylinder 128 that is selectively placed in fluid communication with a fluid reservoir 130. Connection of the cylinder 128 to the reservoir 130 is accomplished by means of a nulling valve 132 whose position is controlled by a solenoid 134. The valve 132 is normally biased into the closed position, illustrated in FIG. 10, by a spring 136. The reservoir 130 is conneceted to a pneumatic pressure input line 138 that provides a supply of pressurized gas. When the valve 132 is opened, fluid from the reservoir 130 pressurizes the cylinder 128 to a predetermined value. Preferably, this predetermined value is set to be approximately 75% of the maximum pressure rating for the transducer 50, so that when the nulling valve 132 is opened, the fluid re-pressurizes the cylinder 128 to 75% of the maximum pressure rating for the transducer 50. This pressure valve can be adjusted through appropriate control of the pressure of the input line 138. The valve 132 includes an equalization bore 140 to enable the pressure on both sides of the valve 132 to equalize when the valve returns to the closed position.

Figure 12:
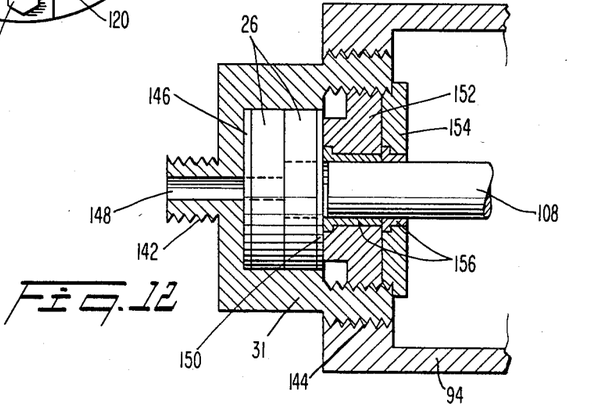
FIG. 12 is a side view, partly in section, of a sixth embodiment of a pressure cylinder in combination with a second embodiment of an hydraulic module main housing.

Another embodiment of a pressure cylinder and a main module housing is illustrated in FIG. 12. In this embodiment, the pressure cylinder 26 comprises an open cavity cylinder that is filled with an hydraulic fluid. The main module housing 31 has a set of external threads 142 at one end thereof for direct connection to a function adapter 10. The other end of the main module housing 31 also includes a set of external threads 144 for connection to a transducer interface housing 94. An initial flex plate 146 is disposed within the module housing 31 adjacent an orifice 148 in the end that is connected to the function adapter, and receives the fluidic pressure signal from the adapter. One or more pressure cylinders 26 are inserted in series adjacent the initial flex plate 146, and the open end of the cavity in the last pressure cylinder is covered by a flexible diaphragm seal 150 that is preferably made from a non-porous, elastic material. All of these elements are held in place within the main module housing 31 by a pressure cylinder seating and sealing ring 152 that is threaded to the housing. This ring is in turn held in place by a lock ring 154. The sealing ring 152 and lock ring 154 are provided with suitable bushing sleeves 156 to accomodate reciprocal movement of a primary interface member 108 in the transducer interface unit.

When a function adapter, one or more pressure cylinders, a main housing and a transducer interface unit are assembled in the manner illustrated in FIG. 1, they operate to effectively provide controlled modification of an input pressure to bring it to a value within the range of operability of the low pressure transducer 50. The transducer operates essentially by interpreting linear movement against it as a pressure, and the function of the pressure cylinder and hydraulic module main housing assembly is to control the linear movement of the output flex plate or diaphragm of the assembly, and the interface mechanism that transmits this movement to the transducer, through appropriate modification of the input pressure. If the initial input pressure is too great and the linear movement that would be caused by its direct application to the transducer is excessive, it could crush and ruin the transducer. On the other hand, if the pressure to be measured is exceedingly small, the resulting linear movement would be too slight to be detected by the transducer.

The modification of the input pressure to a range that is compatible with that of the transducer 50 is dependent upon the thickness and flexibility of the flex walls or plates provided in the pressure cylinders as well as the size of the orifice through which the hydraulic fluid operates to effect movement of the walls and diaphragms. For example, to reduce a high input pressure to a range that is compatible with a low pressure transducer, the input side of the pressure cylinder would be provided with a relatively small diameter input orifice so that the effective linear movement of the flex plate is concentrated over a relatively small area. Thus, the small diameter plate would flex inward a moderate amount to pressurize the hydraulic fluid within the pressure cylinder module. At the other end, the module would be provided with an output diaphragm of a larger diameter. This diaphragm would be forced outward, but because of its large surface area relative to the input diaphragm, its linear travel in an outward direction would be proportionately less than that provided at the input end. If this amount of linear travel is still too great to be accepted by the transducer, as many pressure cylinder modules can be serially connected as is necessary to further reduce the final output pressure to a range that is compatible with the transducer.

Conversely, to amplify a small pressure input signal to a range that can be detected by the transducer, the pressure cylinder modules are arranged in a reverse fashion so that the input pressure acts on a relatively large surface area and the output diaphragm has a small diameter.

Figure 13:
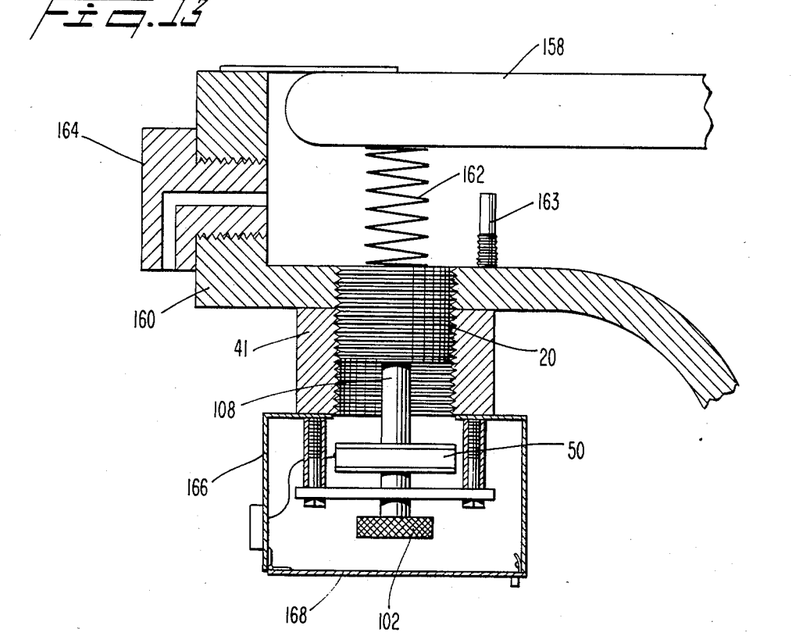
FIG. 13 is a side view, partly in section, of a sensing gauge in combination with a dump valve, for functioning as an orifice sensing unit.

Another modification of the present invention that can be used to provide an output signal related to the size of an opening, or orifice, through which a fluid flows is illustrated in FIG. 13. More particularly, the embodiment of FIG. 13 provides an indication of the size of the opening of an oil field dump valve 158, and hence the amount of fluid flowing therethrough. A pressure cylinder 20 is connected to the dump valve housing 160, which in this case also serves as part of a function adapter. The function adapter also includes a flexible interface member, such as a spring 162, disposed between the dump valve 158 and the pressure cylinder. A stop bolt 163 can be provided on the housing 160 to limit downward travel of the dump valve 158 so that the pressure transducer's maximum pressure in not exceeded. As the dump valve 158 opens to permit fluid to flow therethrough to a vent 164, the interface member 162 produces a pressure signal that is applied to the input side of the pressure cylinder 20. The modified pressure signal that is produced by the pressure cylinder 20 is transmitted to the transducer 50 in a transducer interface unit 41 by means of a solid body primary interface member 108.

If desired, a cover 166 can be provided over the transducer interface unit 41, as shown in the embodiment of FIG. 13, and can have a door 168 to provide access to the nulling knob 102.

Figure 14:
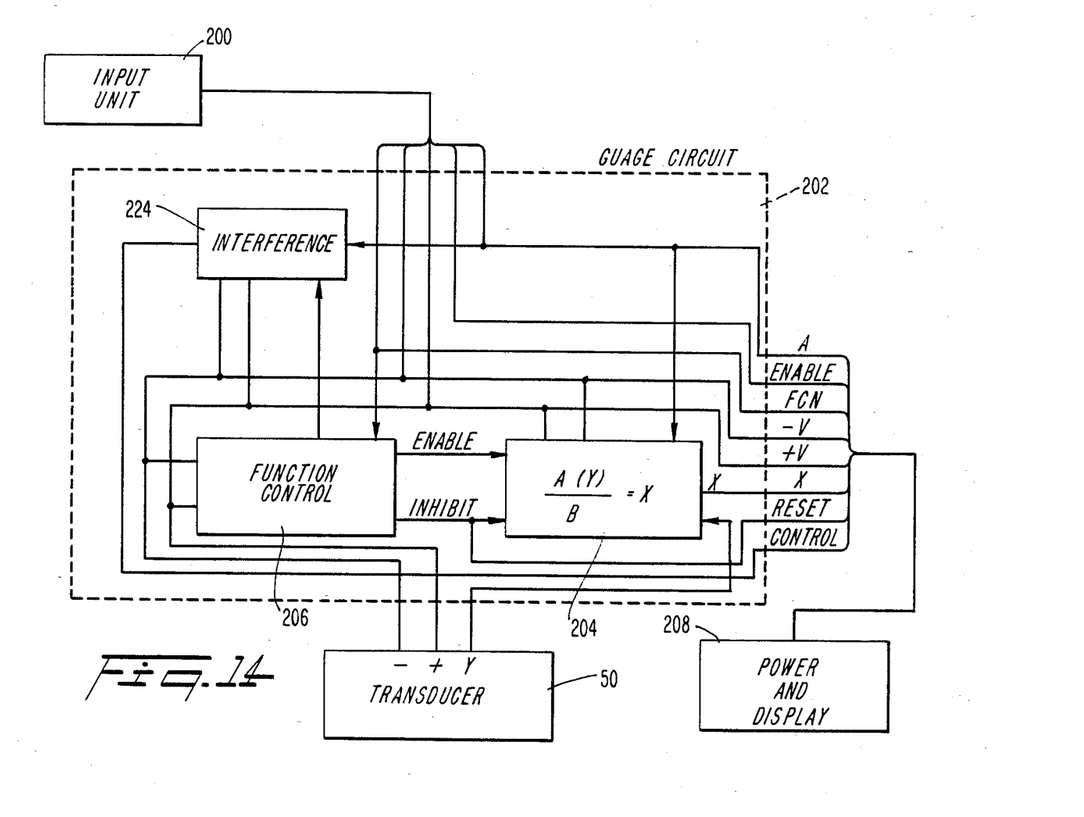
FIG. 14 is a block circuit diagram of a transducer signal processing circuit.

The output signal that is generated by the transducer can be multiplied by a scaling factor that is related to the range of actual pressures being measured, and this value can be displayed to provide an indication of the measured pressure. One example of the circuit for processing the output signal of the transducer to provide an appropriate display is illustrated in FIG. 14. An input unit 200 enables manually entered data and control signals to be applied to a gauge circuit 202. The manually entered data can include a programmed standard value A that represents the midpoint pressure value of the actual pressure range being measured, e.g. the pressure of a liquid in a tank. This value is stored in the memory portion of an interface circuit 204 within the gauge circuit 202. Control of the writing of this value into the interface circuit memory can be carried out by an enable signal generated through the input unit 200.

The interface circuit 204 receives the output signal Y from the transducer 50. This signal is multiplied by a scale factor equal to the programmed standard value A divided by the midrange pressure value B of the transducer operating pressure range. The results of this multiplication are produced as an output signal X that is indicative of the actual pressure being measured. This output signal can be applied to a display circuit 208 for suitable indication of the measured value.

Figure 15:
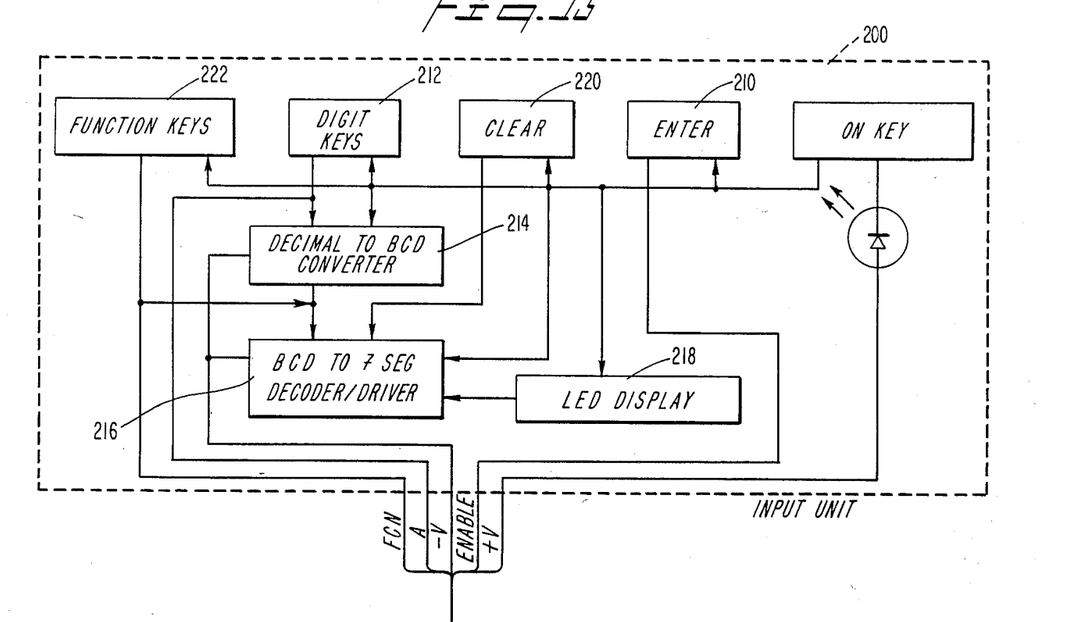
FIG. 15 is a block circuit diagram of the signal processing circuit input unit.

An input unit 200 that can be used to apply control and data signals to the gauge circuit 202 is illustrated in block diagram form in FIG. 15. The input unit includes a keyboard having an ENTER key 210 for generating the enable signal that is provided to the interface circuit 204 of the gauge circuit 202. The programmed standard value A that is to be stored in the interface circuit is manually entered by means of digit keys 212, for example keys labeled 0–9, on the keyboard. The information that is entered by the digit keys 212 can also be presented to a decimal-to-BCD converter 214 for application to a decoder/driver 216 that controls an appropriate LED display unit 218. A CLEAR key 220 can be provided on the keyboard to clear the display 218 and reset it for the entry of new data.

In addition to entering the standard programmed value, the input unit can also be used to control various other functions that can be performed by the gauge system. For example, if an optional printer is included with the system, it can be activated by means of an appropriate function key 222 in the input unit 200. The signal provided by the function key is applied to a function control circuit 206 in the gauge circuit. In response thereto, the function control circuit generates appropriate address and control signals that are applied to the printer or other structure whose function is being controlled. This control signal can be applied to the circuit being controlled by means of an appropriate interface circuit 224 within the gauge circuit 202.

The measuring system can also include a suitable warning system to provide an indication when the measured parameter e.g. pressure, exceeds a predetermined safe value. One of the function keys 222 can be used to activate the warning system, and the digit keys 212 can be used to enter the threshold value that should not be exceeded.

Figure 16:
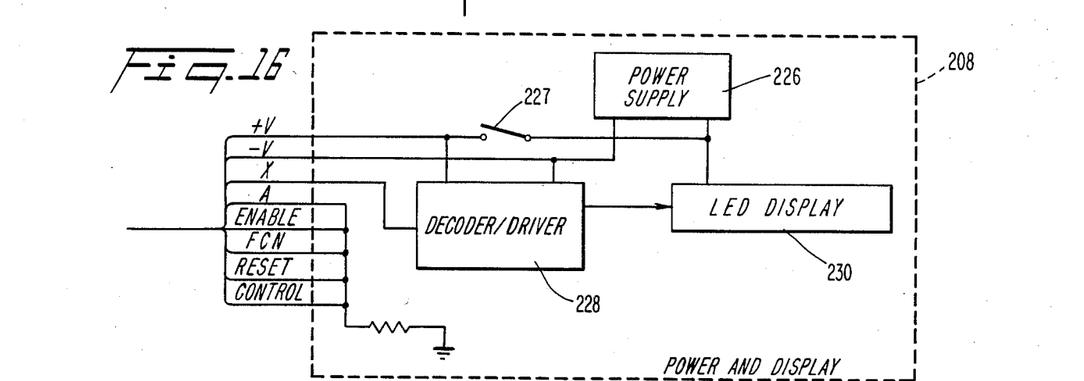
FIG. 16 is a block circuit diagram of the signal processing circuit power and display system.

The display circuit 208 can be utilized to provide power to the measurement system as well as display the measured results. One example of a circuit that can be used in conjuction with the gauge circuit of FIG. 14 is illustrated in block diagram form in FIG. 16. The circuit can include a power supply 226 that provides power at an appropriate level to the transducer 50, the gauge circuit 202 and the input unit 200. The supply of power can be controlled by an appropriate switch 227 connected in series with one of the ouput terminals of the power supply unit 226. The display unit includes a decoder/driver 228 that receives the gauge circuit output signal X. In response to this signal, the decoder/driver 228 controls actuation of a display, such as a seven segment LED display unit 230, to provide an indication of the measured pressure value.

The gauge circuit illustrated in FIG. 14 is capable of performing a number of functions other than multiplying the transducer output signal Y by an appropriate value to provide an indication of the measured pressure value. For example, it can be used to actuate the automatic nulling operation of the remotely controlled interface unit illustrated in FIG. 10. A variation of the circuit illustrated in FIG. 14 for carrying out this operation is illustrated in block diagram form in FIG. 17. In this embodiment, the input unit 200 is not connected to the gauge circuit 202. Rather, both the input of information and display of the measured value are accomplished in a remote transmission unit 232.

Figure 17:
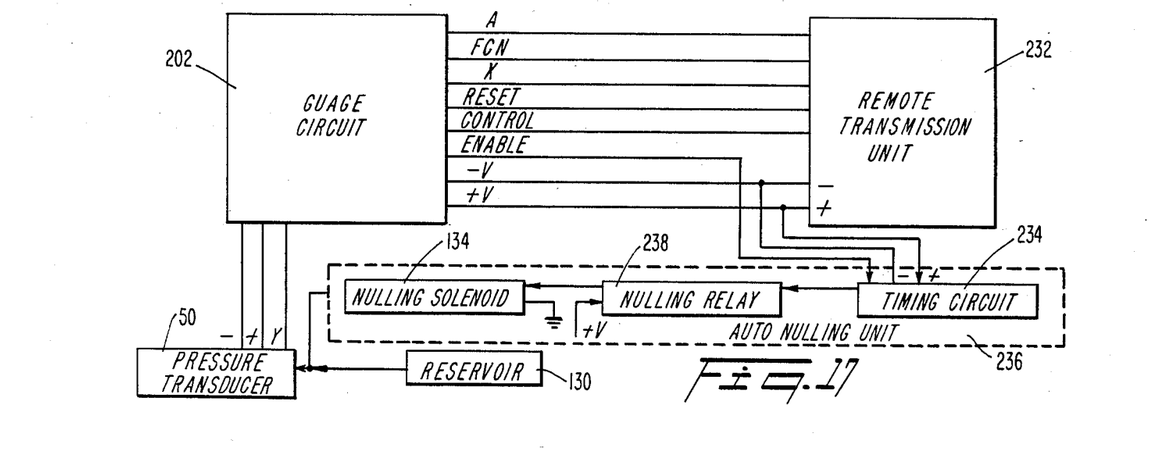
FIG. 17 is a block circuit diagram of a second embodiment of a signal processing circuit having remote nulling control.

The remote transmission unit can include a keyboard or the like for entering the programmed standard value A into the memory of the interface circuit 204. In addition, it can include several function control keys for providing appropriate function address and control signals to the function control circuit 206 in the gauge circuit. For example, when the memory in the interface circuit 204 is enabled to receive a new standard programmed value, the function control circuit 206 can generate this enable signal. This signal is also applied to a timing circuit 234 in the automatic nulling unit 236. In response to the enable signal, the timing circuit 234 produces an actuation signal of suitable duration, for example three seconds, that is applied to a relay 238 in the nulling unit. The relay in turn actuates the solenoid 134 in the remotely controlled unit illustrated in FIG. 10, to automatically adjust the output signal of the pressure transducer 50 in the manner described previously.

In addition to actuating the automatic nulling unit, the function control circuit 206 can control such functions as activating a printer within the remote transmission unit 232, and initiate continuity tests within the internal circuitry of the various gauge circuits. These functions are performed in response to receipt of a function signal from the remote transmission unit, which causes the function control circuit 206 to generate appropriate address and control signals that are applied to the circuit to be controlled through the interface circuit 224 in the gauge circuit 202.

Figure 18:
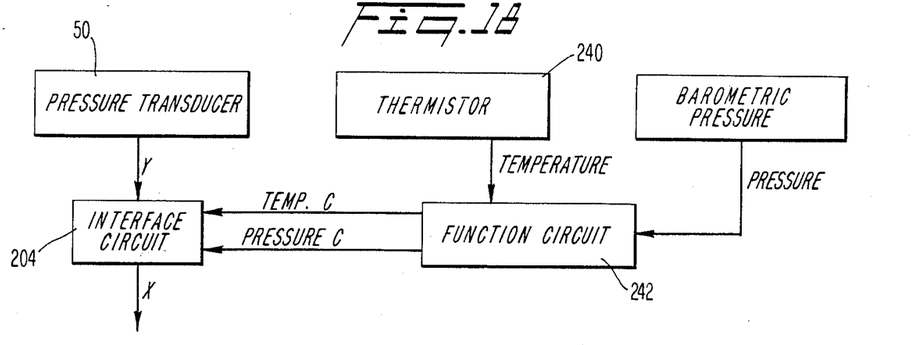
FIG. 18 is a block circuit diagram of a standard condition correction circuit for the transducer output signal.

In some instances it may be desirable to correct the measured pressure for standard temperature and barometric pressure conditions. One example of a circuit for doing so is illustrated in block diagram form in FIG. 18. The output signal from a thermistor 240 that is in contact with the hydraulic fluid within the modules 20 or 30 is supplied to a function circuit 242, which can be part of the function control circuit 206 in the gauge circuit 202 or can be a separate circuit. The function circuit 242 is also supplied with information relating to the barometric pressure of the atmosphere. It converts the output signal from the thermistor 240 into a logarithmic signal that is applied to the transducer pressure interface circuit 204 as a temperature correction signal. The barometric pressure signal is converted to a numerical value in the function circuit 242, which is derived from the percentage increase or decrease from standard pressure. This numerical value is applied to the interface circuit 204 as a pressure correction signal. An initial stage of the interface circuit 204 can receive these two correction signals along with the output signal Y of the transducer 50. The pressure transducer output signal can be corrected for standard temperature and pressure conditions according to the formula:

$$\text{Log } T(Y) + BV = Y_2$$

where:

Log T = temperature correction factor
Y = pressure transducer output signal
BV = barometric pressure correction factor, and
$Y_2$ = corrected transducer output signal.

The corrected output transducer signal is then multiplied by the standard programmed value A in the manner indicated previously to provide a measured pressure output signal X.

Figure 19:
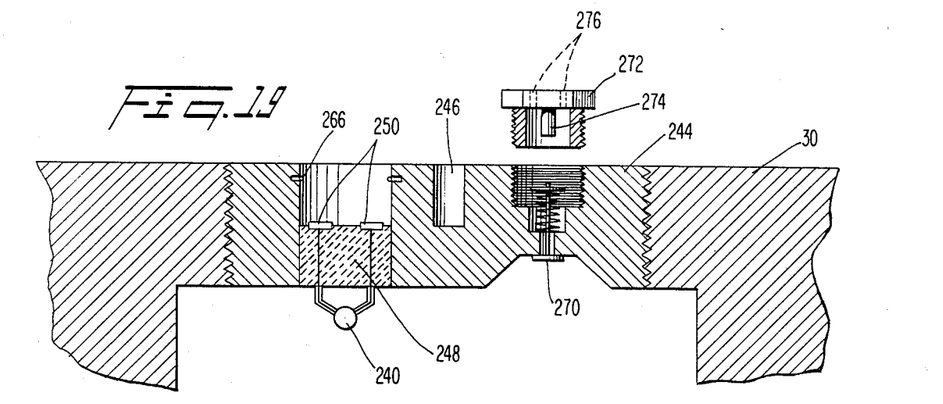
FIG. 19 is a sectional side view of a thermistor and bleed valve adapter for the hydraulic module main housing.

A modification of the hydraulic module main housing 30 that is provided with a thermistor for measuring the temperature of the hydraulic fluid within the housing is illustrated in FIG. 19. The housing 30 is provided with a threaded opening in which a thermistor/bleed valve housing 244 is inserted. The housing 244 can be provided with a slot 246 to enable it to be installed and removed from the main housing 30 by means of an appropriate tool, such as a screwdriver for example. The housing 244 includes an opening in which a ceramic core 248 is tightly fitted. The thermistor 240 projects from the interior face of the core 248 into the cavity of the main housing 30. The opposite face of the core 248 is provided with a pair of contacts 250 that enable the leads of the thermistor 240 to be connected to the function circuit 242.

Figure 20:
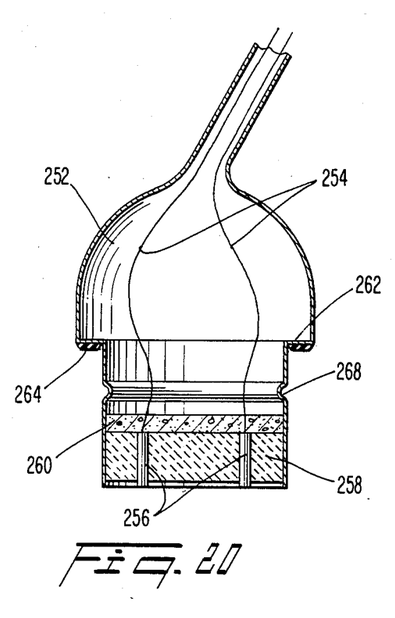
FIG. 20 is a side view of a jack for connecting the thermistor with the signal processing circuit.

This connection can be carried out by means of a plug such as that illustrated in FIG. 20. The plug includes a molded housing 252 having a narrow portion that fits within the opening in the thermistor housing 244. Connecting wires 254 are disposed in the plug housing and terminate at contact pins 256 mounted within an insulator plate 258 provided at the end of the narrow portion of the housing 252. A sponge pressure pad 260 can be provided between the insulator plate 258 and the housing. An enlarged portion of the plug housing 252 provides a shoulder 262 that rests on the exterior of the thermistor/bleed valve housing 244. A moisture seal 264 can be provided on this shoulder to prevent moisture from seeping into the opening in the housing 244 which can lead to corrosion of the contacts 250. A retainer spring 266 provided around the circumference of the opening fits into a circumferential groove 268 on the narrow portion of the plug housing 252 to thereby resiliently retain the plug in operative contact with the thermistor 240.

In addition to the thermistor, the embodiment illustrated in FIG. 19 also includes a bleed valve 270. This bleed valve is spring biased to be in a normally closed position to prevent hydraulic fluid within the cavity of the main module housing 30 from escaping. When the housing is being filled with hydraulic fluid through the opening 93 (llustrated in FIG. 1), the bleed valve 270 is held in an open state by means of a bleed screw or nut 272. The threaded portion of the nut 272 is hollow to accomodate the stem of the bleed valve 270, and includes a projection 274 that engages the stem and causes the valve to open as the nut is screwed onto the housing 244. The cap portion of the nut also includes overflow ports 276 through which excess hydraulic fluid and pressure are vented when the bleed valve 270 is maintained in an open position by the nut. The nut is preferably left on the housing 244 to keep the bleed valve 270 open until after the screw 94 is inserted in the opening 93 of the housing 30 to close it. Thereafter, the bleed valve nut is removed from the housing 244 to close the bleed valve 270, and is replaced with a suitable dust cover or seal (not shown).

Figure 21:
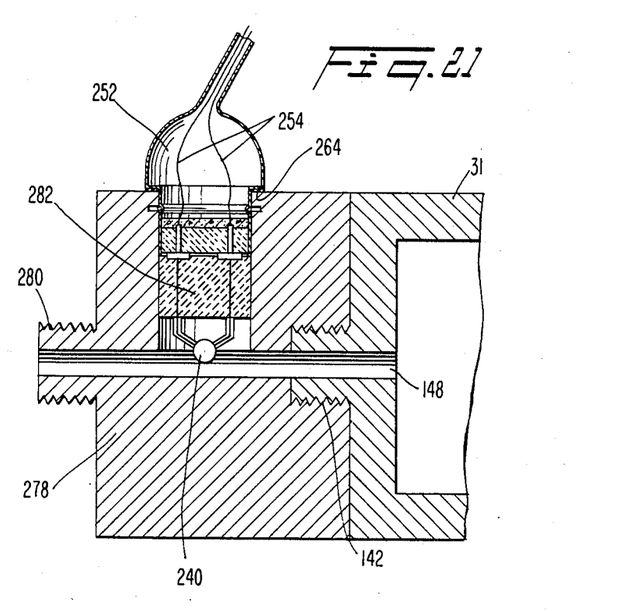
FIG. 21 is a sectional side view of a second embodiment of a thermistor adapter.

A second embodiment of a thermistor housing, for use with the gauge assembly module illustrated in FIG. 12, is depicted in FIG. 21. In this embodiment, the thermistor housing is a substantially cylindrical member 278 that is provided with internal threads on one end thereof for mating with the external threads 142 of the module housing 31. An internal bore is provided on the cylinder to be in coaxial alignment with the orifice 148 on the module housing 31, and the cylinder is provided with external threads 280 on the opposite face for attachment to a tank or the like. The cylinder 278 houses a ceramic core 282 in which the thermistor 240 is mounted in a manner similar to the embodiment of FIG. 19, to be in fluid communication with the hydraulic fluid present within the internal bore of the cylinder 278. The output signal from the thermistor 240 can be conveyed to the function circuit 242 by means of a plug 252 of the type illustrated in FIG. 20.

From the foregoing, it will be appreciated that the present invention is capable of providing any one or more of the measurements related to the pressure (corrected for standard values) and temperature of a fluid and the orifice, or opening, of a dump valve by means of a relatively inexpensive low pressure transducer. Furthermore, the invention in concert with these capabilities can be utilized as a flow meter. One example of a circuit for utilizing the pressure, temperature and orifice output signals obtained by the present invention to indicate rate of flow of a fluid is illustrated in block diagram form in FIG. 22.

Figure 22:
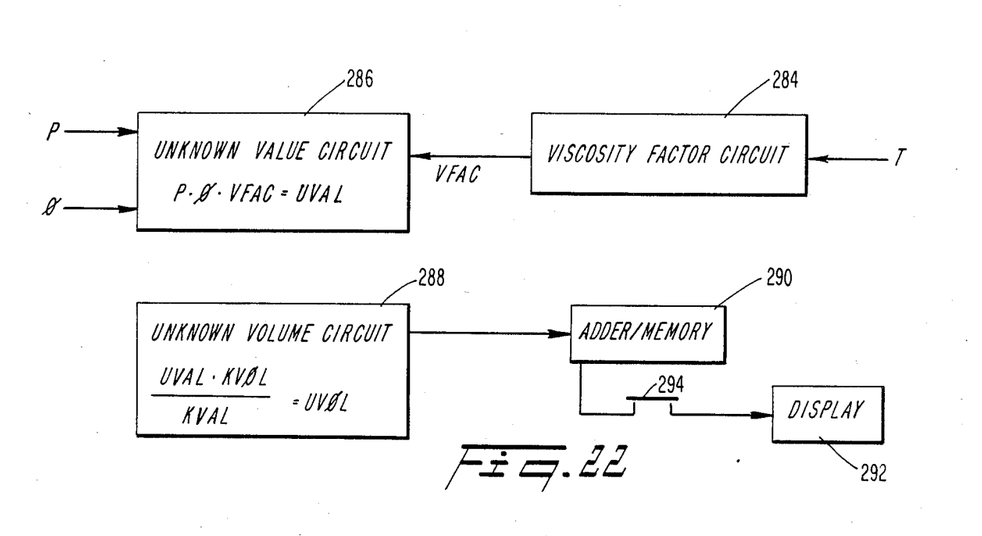
FIG. 22 is a block circuit diagram of a flowmeter circuit.

The measured temperature T of the fluid whose flow is to be determined is applied to a viscosity factor circuit 284 that produces an output signal $V_{fac}$ indicative of the viscosity of the fluid at the measured temperature. This value, which can be initially determined through empirical methods, is applied to an unknown value circuit 286 that also receives the corrected pressure P and orifice measurement ∅ signals. The unknown value circuit multiplies the three input signals to produce an output signal $U_{val}$ related to the unknown value, i.e. the flow rate of the fluid. This value is applied as an input signal to an unknown volume circuit 288 that multiplies it by a suitable scale factor $K_{vol}/K_{val}$ to arrive at the volume of fluid that is flowing through the dump valve. The scale factors $K_{vol}$ and $K_{val}$ are empirically determined standardizing values that are written into the memory of the unknown volume circuit 288, for example at the time of manufacture of the circuit. The unknown volume that is determined by the circuit 288 is fed to an adder/memory unit 290, where it is added to the volumes previously stored in the circuit to provide an indication of the total volume of fluid that has passed through the dump valve. This volume can be read on a display unit 292 by an operator through actuation of a display switch 294. If desired, the total volume stored in the adder/memory unit 290 can be divided by the elapsed time to provide an indication of average flow rate.

The output signal ∅ from the orifice sensing unit can also be used to control energization of the various measuring circuits in the flowmeter. Thus, when the dump valve is closed (no fluid is flowing), the gauges and circuits that are used to perform the flowmeter calculations can be turned off until the valve opens.

In the preceding embodiments, the sensing gauge constructed in accordance with the present invention has been disclosed as being essentially a self-contained unit. However, the modular nature of its components facilitates their use in connection with conventional sensing devices as well.

Figure 23:
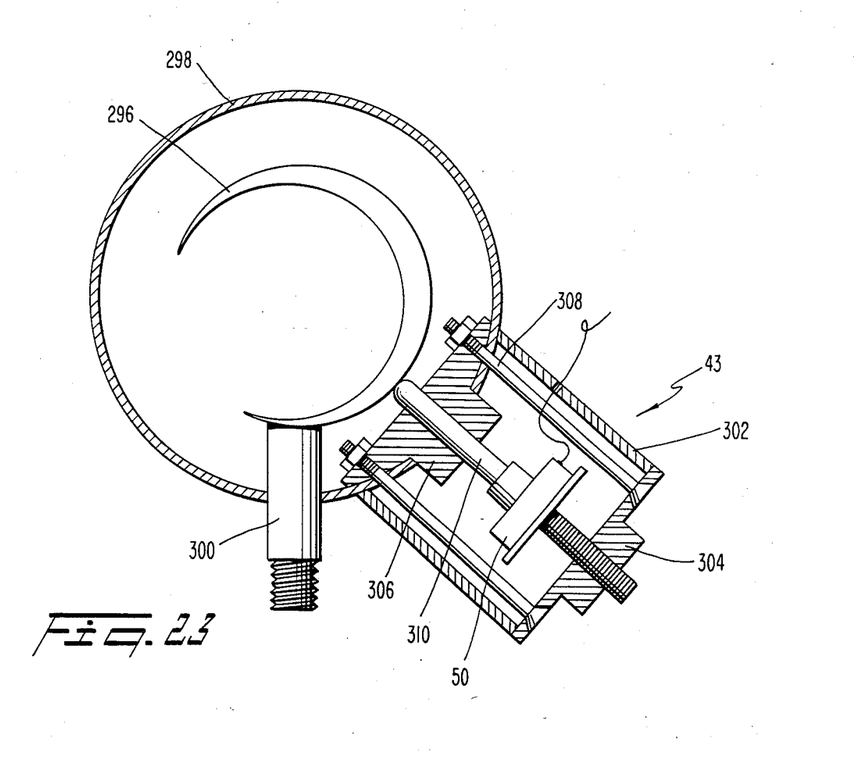
FIG. 23 is a sectional side view of the sensing gauge of the invention incorporated with a conventional Bourdon-tube pressure gauge.

For example, it is feasible to incorporate the transducer interface unit with a Bourdon-tube pressure gauge to provide an electronic pressure reading as well as the conventional mechanical indication. Referring to FIG. 23, the Bourdon-tube pressure gauge generally comprises a curved, deformable tube 296 within a casing 298. The tube might have a circular or oval cross-sectional shape. One end of the tube is connected to a fluid inlet 300 and the other end is closed. In operation, as the pressure of the fluid in the tube increases, the radius of curvature of the tube also increases, i.e. the tube tends to straighten out. Typically, a mechanical pointer is connected to the closed end of the tube to provide an indication of the sensed pressure on a calibrated dial.

In accordance with the present invention, a transducer interface unit 43 can be attached to the casing 298 to operatively connect the Bourdon tube 296 with a transducer 50. The interface unit includes a housing 302 with a cover plate 304 and an internal guide member 306 that are rigidly attached to each other and to the casing 298 by means of bolts 308, screws or the like. Radial movement of the Bourdon tube 296 caused by variations in pressure are transmitted to the transducer 50 by a solid body primary interface member 310. Such an interface member can be used when the Bourdon tube alone modifies, i.e. steps down, the input pressure to a level compatible with the operating range of the transducer. If further modification is desirable, an appropriate hydraulic pressure cylinder or a flexible interface member can be substituted for, or used in conjunction with, the solid body interface.

Through suitable processing of the output signal produced by the transducer 50, an indication of the sensed pressure can be electronically provided. Thus, the advantages of electronic pressure monitoring can be achieved at minimal expense by modifying a mechanical pressure gauge. At the same time, the normal mechanical operation is retained and can be relied upon as a back-up should the electronic system malfunction.

The present invention can be embodied in other specific forms without departing from the spirit or the essential characteristics thereof. The presently disclosed embodiments are therefore considered in all respects to be illustrative and not restrictive. The scope of the invention is indicated by the appended claims, rather than the foregoing description, and all changes that come within the meaning and range of equivalency of the claims are therefore intended to be embraced therein.

What is claimed is:

1. Apparatus for measuring a parameter of a fluid comprising:
   an adapter for providing an output signal having a pressure related to a parameter being measured;
   a transducer for providing an electrical output signal having a value indicative of a pressure applied thereto;
   plural means for modifying the adapter output signal to a value directly proportional to said output signal, each of the plural means having a different proportionality between the adapter output signal and the modified signal, and
   means connecting at least one of said plural means between said adapter and said transducer, including means for applying to said transducer a modified signal that is within the operating range of said transducer, said connecting means enabling said one of said plural means to be removed from between said adapter and said transducer and a different one of said plural means to be substituted therefor.

2. The apparatus of claim 1 wherein said plural means for modifying each comprises a housing having a cavity filled with a substantially non-compressible fluid, and a flexible wall on each of two opposite sides of said cavity.

3. The apparatus of claim 2 wherein said housing includes a cylinder having an axial recess therein and one of said flexible walls is provided by a flexible diaphragm over said recess at one end of said cylinder.

4. The apparatus of claim 3 wherein the other flexible wall is provided by an end face of said cylinder.

5. The apparatus of claim 3 wherein said recess extends through said cylinder, and the other flexible wall is provided by a flexible plate disposed at the other end of said cylinder.

6. The apparatus of claim 5 further including an apertured plate disposed within said recess adjacent said flexible diaphragm.

7. The apparatus of claim 5 or 6 further including a flexible cup disposed within said recess to prevent fluid from leaking past said flexible plate.

8. The apparatus of claim 3 further including a protective wafer attached to said flexible diaphragm on the side opposite said recess.

9. The apparatus of claim 3 further including a threaded coupling fitted to the exterior of said cylinder, and wherein said flexible diaphragm extends around the side of said cylinder and is disposed between said cylinder and said coupling.

10. The apparatus of claim 2 wherein said housing includes a cylinder having an axial bore therethrough, and one of said flexible walls is provided by a flexible plate disposed at one end of said cylinder.

11. The apparatus of claim 10 further including a flexible cup disposed within said bore to prevent fluid from leaking past said flexible plate.

12. The apparatus of claim 11 further including a threaded coupling fitted to the exterior of said cylinder, and wherein said flexible cup extends around the side of said cylinder and is disposed between said cylinder and said coupling.

13. The apparatus of claim 10 further including an apertured plate disposed in said bore at the other end of said cylinder.

14. The apparatus of claim 3 or 10 wherein said cylinder is provided with external threads and said connecting means includes an internally threaded coupling housing for connecting two of said cylinders in series, said coupling housing being filled with said substantially non-compressible fluid so that a pressure signal applied to the flexible wall of one cylinder connected to said coupling housing is transmitted to another cylinder connected to said coupling housing and appears as a modified pressure signal at the flexible wall thereof that is exterior to said coupling housing.

15. The apparatus of claim 14 wherein said coupling housing includes means for measuring the temperature of said non-compressible fluid.

16. The apparatus of claim 15 where said measuring means comprises a thermistor.

17. The apparatus of claim 14 wherein said coupling housing includes a bleed valve for permitting excess fluid to be vented from said coupling housing.

18. The apparatus of claim 2 wherein said means for applying the modified signal to said transducer includes a primary interface member in engagement with one of said flexible walls, a base plate on the side of said primary interface member opposite said flexible wall, a top plate engaging one face of said transducer, and a secondary interface member disposed between said base plate and said top plate.

19. The apparatus of claim 18 wherein said secondary interface member is flexible.

20. The apparatus of claim 19 wherein said secondary interface member comprises a spring.

21. The apparatus of claim 18 wherein said secondary interface member is a non-compressible body.

22. The apparatus of claim 18 further including an interface housing for said transducer and said applying means, said interface housing including nulling means engaging the opposite face of said transducer for applying an adjustable pressure thereto.

23. The apparatus of claim 22 wherein said nulling means comprises a manually adjustable threaded knob.

24. The apparatus of claim 22 wherein said nulling means is remotely adjustable.

25. The apparatus of claim 24 wherein said nulling means comprises a nulling plate engaging said opposite face of said transducer, ratchet lock means disposed between said nulling plate and said interface housing, a piston engaging said nulling plate, and remotely controlled means for applying a fluid pressure to said piston.

26. The apparatus of claim 25 wherein said remotely controlled means for applying fluid pressure includes a cylinder in which said piston is disposed, a pressurized fluid reservoir in fluid communication with said cylinder, and a solenoid operated valve for selectively connecting said reservoir and said cylinder.

27. The apparatus of claim 2 including at least one ring disposed within said cavity between said flexible walls.

28. The apparatus of claim 1 wherein the parameter to be measured is the pressure of the fluid, and said adapter comprises means for providing fluid communication between a container in which said fluid is disposed and said modifying means.

29. The apparatus of claim 1 wherein the parameter to be measured is the temperature of the fluid, and said adapter comprises a fluid filled probe, said probe having a flexible diaphragm at one end thereof for providing spatial displacement in dependence upon expansion and contraction of the fluid in said probe related to variations in temperature.

30. The apparatus of claim 29 wherein said probe is filled with an alcohol medium.

31. The apparatus of claim 29 wherein said probe is filled with mercury.

32. The apparatus of claim 29 wherein said probe is filled with an inert gas.

33. The apparatus of claim 1 wherin the parameter to be measured is the volume of fluid passing through a dump valve, and said adapter includes a flexible interface member disposed between said dump valve and said modifying means.

34. The apparatus of claim 33 wherein said flexible interface member comprises a spring.

35. The apparatus of claim 34 further including means for limiting movement of said dump valve to thereby limit maximum compression of said spring.

36. The apparatus of claim 1 including means for multiplying said electrical output signal by a scaler factor related to the parameter being measured and displaying the resulting product, and means for entering a value related to a range of values of the parameter being measured.

37. The apparatus of claim 36 wherein the entered value is a midpoint value for said range.

38. The apparatus of claim 36 further including means for correcting said electrical output signal for standard temperature and pressure conditions.

39. The apparatus of claim 36 including processing circuits for providing indications of each of the pressure and temperature of a fluid and the opening of a valve and further including means for combining these indications to provide a display related to the flow of the fluid.

40. The apparatus of claim 1 wherein said plural means for modifying include a Bourdon tube.

* * * * *